Patented Nov. 21, 1933

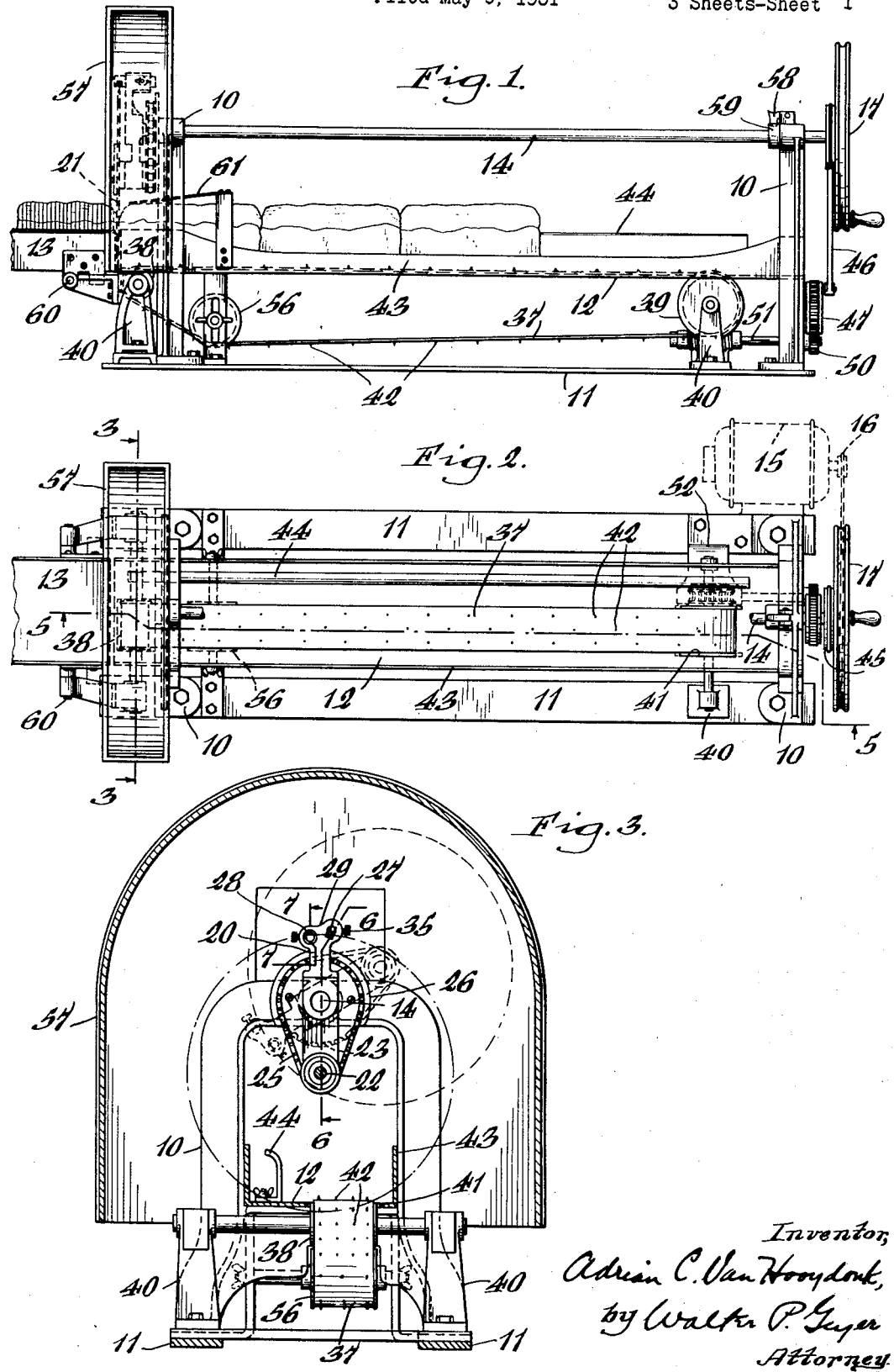

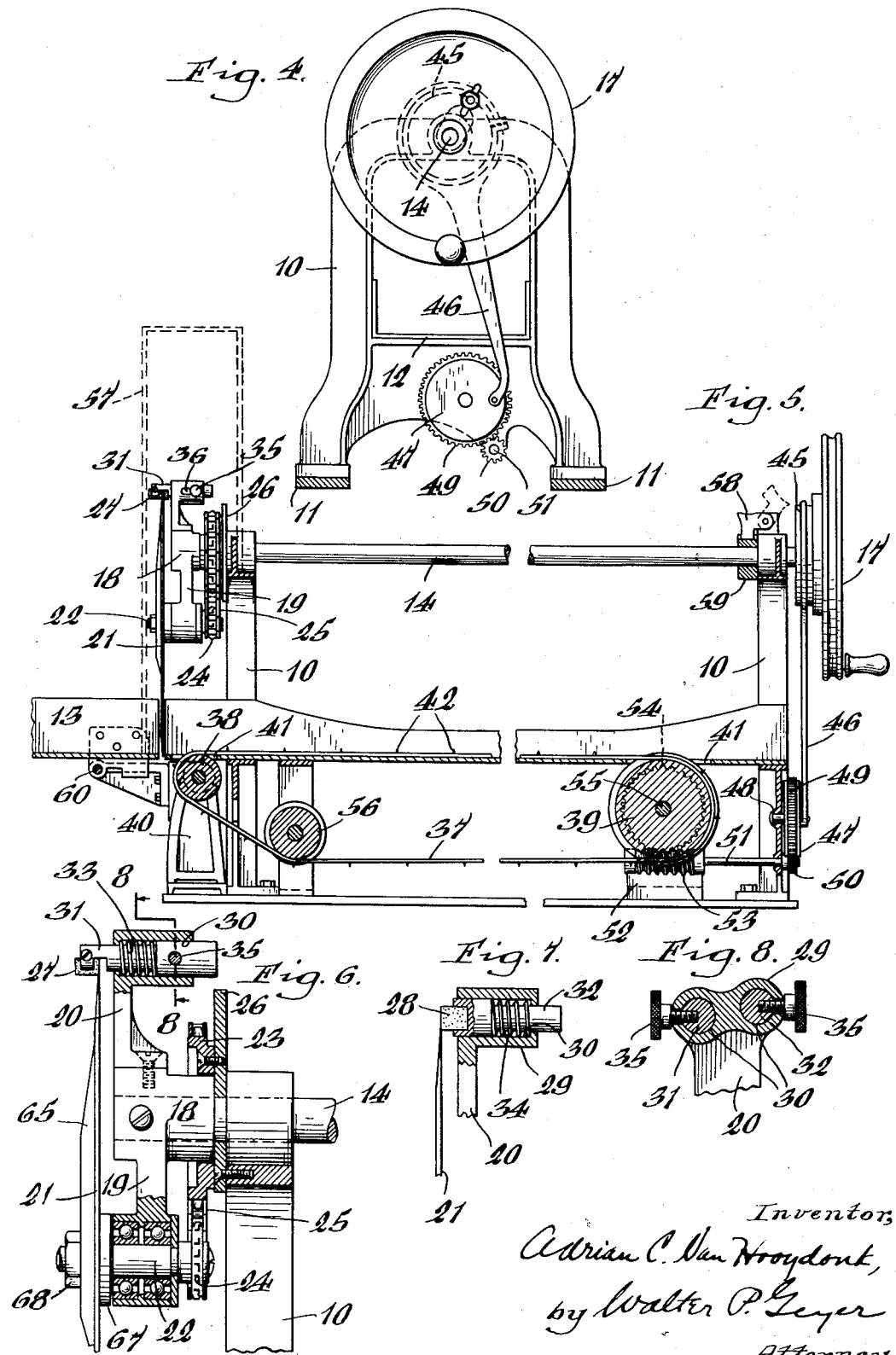

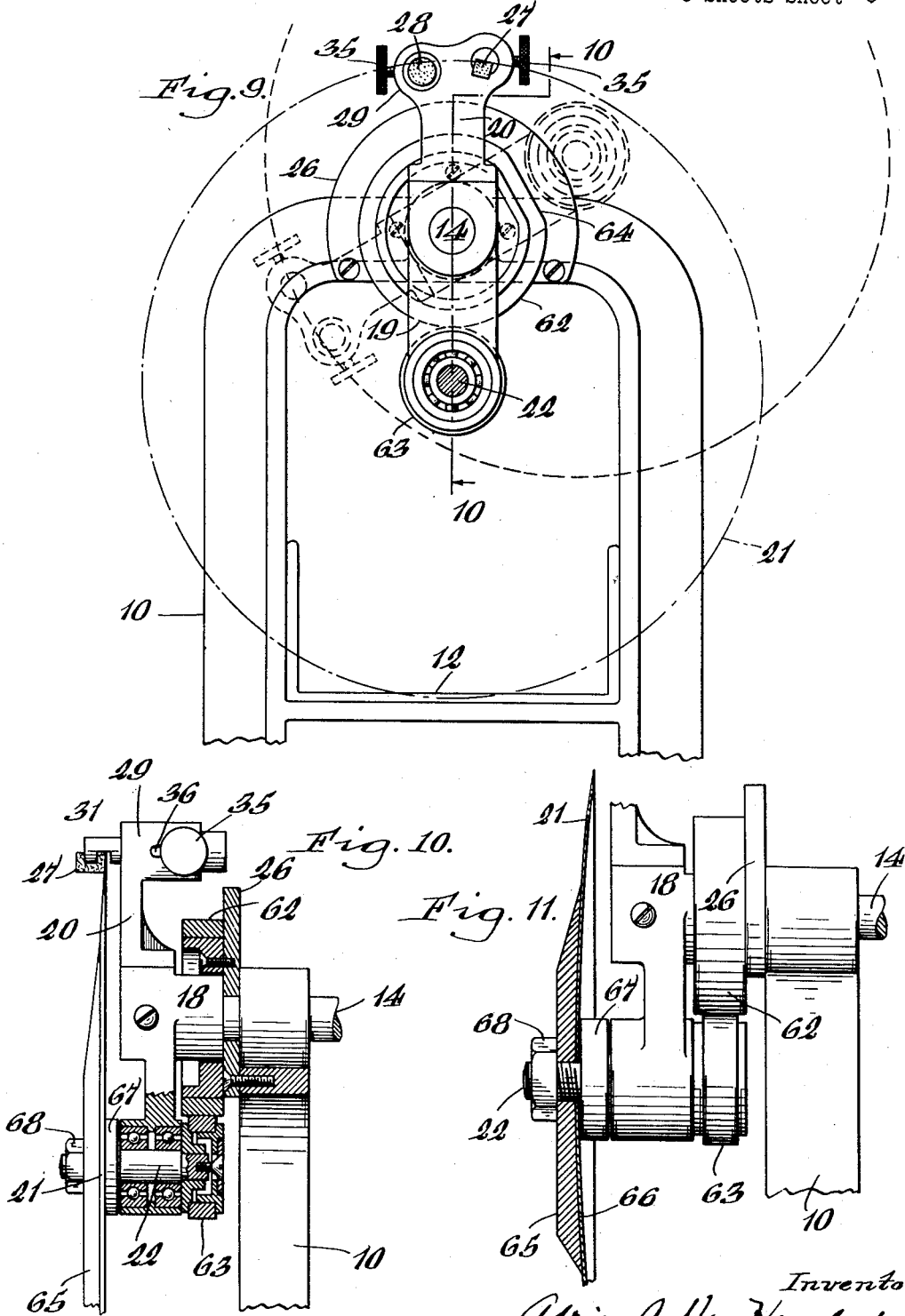

1,936,278

UNITED STATES PATENT OFFICE 1,936,278

BREAD-SLICING MACHINE

Adrian C. Van Hooydonk, Buffalo, N. Y., assignor to John E. Smith's Sons Company, Buffalo, N. Y., a corporation of New York Application May 9, 1931. Serial No. 536,232

12 Claims. (Cl. 146—101)

This invention relates to certain new and useful improvements in slicing machines and more particularly to a machine for slicing bread and similar materials.

One of its objects is the provision of a machine of this character which is automatic in operation, which has been designed to expeditiously effect the slicing of bread loaves in an efficient and clean cut manner, and which is reliable in operation and not liable to get out of order.

Another object of the invention is the provision of a power-driven slicing machine having simple and compact means for actuating the revolving knife or cutter.

A further object is to provide the machine with simple and readily adjustable and replaceable means for sharpening the knife during the slicing operation.

In the accompanying drawings:—

Figure 1 is a side elevation of a slicing machine embodying my invention. Figure 2 is a top plan view thereof. Figure 3 is an enlarged cross section taken in the plane of line 3—3, Figure 2. Figure 4 is a rear end view of the machine. Figure 5 is an enlarged longitudinal section of the machine taken on lines 5—5, Figure 2. Figure 6 is an enlarged fragmentary vertical longitudinal section taken in the plane of line 6—6, Figure 3. Figure 7 is a similar section taken in the plane of line 7—7, Figure 3, and showing the sharpening element companion to that shown in Figure 6. Figure 8 is a fragmentary cross section taken on line 8—8, Figure 6. Figure 9 is a fragmentary front view, partly in section, showing a modified form of driving means for the knife. Figure 10 is a vertical longitudinal section taken substantially in the plane of line 10—10, Figure 9. Figure 11 is a fragmentary vertical longitudinal section showing the manner of mounting the knife on its shaft.

Similar characters of reference indicate corresponding parts throughout the several views.

The working parts of the machine are mounted on a suitable frame of any suitable and appropriate construction, that shown in the drawings consisting of a pair of longitudinally-spaced uprights 10, 10 tied at their ends by longitudinal base bars 11, 11. Supported at its ends between the standards is a horizontal table or platform 12 having an extension 13 projecting forwardly beyond the front standard and on which platform the bread is adapted to travel while being sliced.

During the slicing operation, the loaves of bread or other material are successively fed past a revolvable cutting or slicing mechanism which is adapted to produce a drawing cut through the loaves, and which is preferably constructed as follows:—

The numeral 14 indicates a drive shaft which is disposed lengthwise over the platform 12 and is journaled at its ends in the standards 10, 10, the shaft being driven by an electric motor 15 suitably mounted on the machine frame and connected by a belt 16 with a pulley 17 mounted on said shaft. The front end of this shaft extends beyond the front standard 10 and fixed thereon to turn therewith is a knife carrier consisting of a hub 18 and diametrically disposed arms 19 and 20, the knife 21 being preferably in the form of a disc and being mounted on the arm 19 for rotation about its own axis as well as gyration about the axis of the drive shaft 14. To this end, the disc-knife is mounted at the front end of a stud shaft 22 journaled near the outer end of the carrier-arm 19, the axis of the shaft 22 being parallel to that of the drive shaft and being disposed eccentric to or offset radially from the axis of the drive shaft. As the shaft 14 is rotated, the knife moves bodily with it in a circular path and in order to simultaneously transmit a rotary motion to this knife during its gyration about the axis of the drive shaft, I employ a drive mechanism consisting of a stationary gear or sprocket wheel 23 disposed axially of the drive shaft and a revolvable gear or sprocket wheel 24 applied to the inner end of the stud shaft 22, these gears being connected by a sprocket chain 25. As seen in Figure 6, the sprocket wheel 23 is disposed between the carrier-hub 18 and the adjoining front standard 10, the same encircling said hub and being secured to an attaching plate 26 applied to the front standard. By this construction and arrangement of parts, the drive shaft 14 will rotate the knife-carrier in a circular path and at the same time the disc knife will revolve about its axis by reason of the driving connections 23, 24, and 25 between the knife-shaft and the drive shaft, the gear 24 revolving about the axis of the drive shaft and the chain 25 thereby transmitting rotary motion to the gear and thence to the knife.

Mounted on the knife-carrier are means for sharpening the knife during its rotation. These sharpening means are preferably mounted on the carrier-arm 20 and consist of sharpening stones or blocks 27, 28 which are arranged to engage the opposite faces of the cutting edge of the knife, respectively. The outer end of the arm 20 is provided with an enlargement or head 29 containing openings 30 for receiving companion holders 31 and 32 for the respective sharpening stones 27 and 28. These holders are preferably in the form of plunger-like elements guided for movement in the corresponding openings 30 toward and from the faces of the knife 21, the holder 31 having a spring 33 applied thereto for urging it in a rearward direction to bring its stone toward the front or outer face of the knife, while the holder 32 has a spring 34 applied thereto for urging its sharpening element in the opposite direction or toward the inner or rear face of the knife, as clearly shown in Figures 6 and 7. These springs constantly tend to urge the sharpening elements into firm frictional contact with the marginal edges of the knife to sharpen it. When it is not desired to use the sharpening elements, their holders 31 and 32 may be shifted in the proper direction to bring them clear of the knife, and in order to hold them in such inoperative position I provide the holders with clamping screws 35 which are adapted to engage corresponding longitudinal slots 36 in the head 29, as seen in Figure 8. After shifting the holders in the proper direction in the head 29 to bring the sharpening elements clear of the knife, the clamping screws 35 are screwed firmly against the corresponding face of the head to firmly retain the holders in a non-sharpening position.

The conveying mechanism for delivering the bread through the machine for slicing is disposed in the lower portion of the frame between the standards 10, 10 and preferably consists of a longitudinal conveyor belt 37 which passes at its ends around drums or pulleys 38 and 39 journaled in suitable bearing brackets 40 secured to the base-bars 11 of the frame. The platform 12 is provided adjacent these drums with openings 41 and the upper stretch of the conveyor belt passes through these openings and rides over the platform in the manner shown in Figures 3 and 5. The conveyor belt is provided with tooth-like elements or tines 42 which are adapted to engage or penetrate into the bottom side of the bread loaves to positively compel them to be fed by the conveyor toward the knife 21. To facilitate the presentation of the loaves of bread to their proper alined position on the conveyor belt, I preferably provide guide members or plates 43, 44 disposed lengthwise of the platform on opposite sides of the conveyor, the plate 44 being curved or rolled at its upper edge and being laterally adjustable on the platform to vary the effective width between the two plates so as to accommodate loaves of bread of varying widths.

Intermittent motion is transmitted to the conveyor belt 37 to feed the loaves of bread a predetermined distance at regular intervals depending on the thickness of cut or slice desired, this motion being so timed relatively to the knife that the loaf is advanced after the knife has made a cut and before it is ready to make the next cut. Any suitable means may be employed for transmitting intermittent motion to the conveyor belt, that shown in the drawings by way of example, consisting of an eccentric 45 mounted on the drive shaft 14 and connected by a pitman or connecting rod 46 with a ratchet feed mechanism indicated generally by the numeral 47 and of any well known construction. This feed mechanism is mounted on an arbor 48 fastened to the rear standard 10 and includes a gear 49 meshing with a pinion 50 mounted on the rear end of a driven shaft 51 journaled in a bearing bracket 52 and having a worm 53 meshing with a worm wheel 54 applied to the shaft 55 of the rear drum 39.

By this construction, for every revolution of the driving shaft 14 the conveyor belt 37 is advanced in a forward direction a distance equal to that of the width of cut desired, and it will be understood that the cut may be varied by adjusting the eccentric 45 radially of its shaft in any well known manner. As shown in Figures 1 and 5, an idler or tensioning drum 56 may be provided for maintaining the belt taut.

A guard or enclosure 57 is preferably placed over the revolving knife 21 to protect the attendants and prevent their hands coming in the path of travel of the knife.

In order to prevent the drive shaft 14 from turning when removing the cutter or effecting repairs, I preferably employ a locking dog 58 which may be pivoted to the rear standard 10, as shown clearly in Figure 5 and which is adapted to engage a notched collar 59 fixed on said shaft.

As seen in Figures 1 and 2, the platform-extension 13 may be hinged at 60 to swing vertically upward where it is out of the way when the machine is not in use. Also, a yieldable gripping bar 61 may be employed for engaging the top side of the loaf being sliced to assist in firmly holding the loaf to the table.

In Figures 9 and 10, I have shown a modified form of driving means for transmitting rotary motion to the knife 21 while gyrating the same about the axis of the drive shaft 14. This means consists of friction wheels 62 and 63 mounted on the drive shaft 14 and stud shaft 22, respectively, the friction wheel 62 being stationary and the companion wheel 63 being free to revolve about the axis of the drive shaft in peripheral contact with the companion wheel. To facilitate assemblage of the parts, the stationary friction wheel is provided with a substantially flat chord-like portion 64 at its periphery, which permits of readily applying the knife-carrier 18 and associated parts to the end of the drive shaft.

The disc knife 21 is preferably so mounted on its shaft 22 that it is given a concavo-convex form in cross section, bringing its cutting edge out of the plane of the knife-body and producing a clean cut with a minimum of friction. To this end, as shown in Figure 11, a washer 65 is applied to the front end of the knife-shaft which has a concave or dished bearing face 66 at its rear side, the knife being disposed in clamping relation between this washer and a collar or shoulder 67 on said shaft. A clamping nut 68 is mounted on the threaded end of the knife-shaft and when the same is screwed firmly against the washer, the knife is distorted from its normal flat form to the dished shape shown in Figure 11, to conform to the curved face of the washer.

I claim as my invention:—

1. A slicing machine, comprising a drive shaft, an arm fixed thereon and including two substantially radial portions, a knife-shaft journaled in one of said arm-portions, means for transmitting motion from the drive shaft to said knife-shaft for rotating the latter about its own axis and for revolving the same about the axis of said drive shaft, and sharpening means engageable with the cutting portion of the knife revolvable about the axis of the drive shaft and applied to the other of said arm-portions for bodily coextensive gyration with the knife.

2. A slicing machine, comprising a drive shaft, an arm fixed thereon and including two substantially radial portions, a knife-shaft journaled in one of said arm-portions for rotation about its axis and for gyration about the drive shaft, a stationary wheel disposed axially of said drive shaft, a revolvable wheel applied to said knife-shaft and in driving engagement with said stationary wheel, and sharpening means engageable with the cutting portion of the knife revolvable about the axis of the drive shaft and applied to the other of said arm-portions for bodily coextensive gyration with the knife.

3. A slicing machine, comprising a frame, drive shaft journaled therein, an arm mounted thereon and having a knife-shaft journaled therein for rotation about its axis and for gyration about the drive-shaft, a stationary sprocket wheel disposed axially of said drive shaft in independent non-supporting relation to said arm and fixed to said frame, a revolvable sprocket wheel applied to said knife-shaft, a sprocket chain engaging said sprocket wheels, respectively, and a holder for a sharpening element revolvable about the axis of said drive shaft for bodily coextensive gyration with the knife and arranged to engage the face of its cutting edge.

4. A slicing machine, comprising a drive shaft, an arm mounted thereon and having a knife-shaft journaled therein for rotation about its axis and for gyration about the drive shaft, a stationary friction wheel disposed axially of said drive shaft and having a substantially flat chord-like portion on its periphery, and a revolvable friction wheel applied to said knife-shaft and in peripheral contact with said stationary wheel.

5. A slicing machine, comprising a frame, a drive shaft journaled in said frame and projecting beyond one end thereof, a radial arm including a hub fixed on the projected end of said shaft and having a knife-shaft journaled therein adjacent to the outer end thereof for rotation about its axis and for gyration about the drive shaft, the arm-hub facing inwardly in abutting relation to the adjoining end of said frame, a stationary wheel encircling the arm-hub in concentric relation to said drive shaft and fixed to the frame, a revolvable wheel applied to said knife-shaft and operatively connected to said stationary wheel to revolve the knife-shaft during rotation of the drive shaft, and a second arm applied to said drive shaft and having a sharpening element at its outer end for engagement with the edge of the knife.

6. A slicing machine, comprising a frame, a drive shaft journaled in said frame, a member fixed on said shaft and having substantially diametrically opposed radial arms, a knife-shaft arranged parallel to the drive shaft and journaled in one of said radial arms, a knife mounted on the outer end of said knife-shaft, a stationary wheel disposed axially of the drive shaft between said arm-bearing member and said frame, a revolvable wheel applied to the inner end of said knife-shaft and operatively connected to said stationary wheel for revolving the knife-shaft during rotation of the drive shaft, and sharpening means for the knife mounted on the other of said radial arms for bodily coextensive gyration with the knife and arranged to engage the face of its cutting edge.

7. In a slicing machine, a drive shaft, a disc knife mounted on an axis eccentric to the drive shaft, means for revolving said disc knife about its own axis and for gyrating it bodily about the axis of said drive shaft, and sharpening means for the knife bodily revolvable therewith at all times about the axis of the drive shaft and in concentric relation with the cutting edge of the knife.

8. In a slicing machine, a drive shaft, a disc knife mounted on an axis eccentric to the drive shaft, means for revolving said disc knife about its own axis and for gyrating it bodily about the axis of the drive shaft, a supporting member for the disc knife secured to said drive shaft to turn therewith, and sharpening means applied to said supporting member for bodily coextensive gyration with the knife and arranged to engage the face of its cutting edge.

9. In a slicing machine, a drive shaft, a disc knife mounted on an axis eccentric to the drive shaft, means for revolving said knife about its own axis and for gyrating it bodily about the axis of said drive shaft, and a holder for a sharpening element revolvable about the axis of said drive shaft for bodily coextensive gyration with the knife, the sharpening element being disposed for engagement with the face of the cutting edge of the knife.

10. In a slicing machine, a drive shaft, a disc knife mounted on an axis eccentric to the drive shaft, means for revolving said knife about its own axis and for gyrating it bodily about the axis of said drive shaft, a holder fixed on said drive shaft for bodily coextensive gyration with the knife, and sharpening elements applied to said holder for engaging the oposite side faces of the knife's cutting edge.

11. In a slicing machine, a drive shaft, a disc knife mounted on an axis eccentric to the drive shaft, means for revolving said disc knife about its own axis and for gyrating it bodily about the axis of the drive shaft, an arm mounted on the latter adjacent to said knife, a holder for a sharpening stone applied to said arm adjacent its outer end for coextensive gyration with the knife, and a spring for urging said holder in a direction to bring its stone into sharpening engagement with the cutting edge of the knife.

12. A slicing machine, comprising a frame including an elevated platform for the material to be sliced having openings adjacent its front and rear ends, a conveyor belt arranged lengthwise over the platform between said openings and having tines rising therefrom for engagement with the material to be conveyed for slicing, belt-engaging drums disposed below said platform with their top faces engaging the platform-openings, a drive shaft disposed lengthwise over the platform, motion-transmitting means connecting the rear end of said drive shaft with said belt-engaging drums for intermittently driving the belt, an arm fixed on the front end of the drive shaft and including two radial portions, a knife shaft journaled in one of said arm-portions for rotation about its axis and for gyration about the drive shaft, a stationary wheel disposed in concentric relation to said drive shaft alongside said arm and fixed to said frame, a revolvable wheel applied to said knife-shaft and in driving engagement with said stationary wheel, and sharpening means applied to the other arm-portion for bodily coextensive gyration with the knife and arranged to engage the face of its cutting edge.

ADRIAN C. VAN HOOYDONK.